United States Patent [19]

Dietrich et al.

[11] Patent Number: 4,803,246
[45] Date of Patent: Feb. 7, 1989

[54] PROCESS FOR THE PREPARATION OF POLYMERS CONTAINING HYDROXYL GROUPS AND THEIR USE FOR THE PRODUCTION OF POLYURETHANES

[75] Inventors: Manfred Dietrich, Leverkusen; Josef Pedain, Cologne; Klaus König, Leverkusen; Peter Höhlein, Kempen, all of Fed. Rep. of Germany

[73] Assignee: Bayer Aktiengesellschaft, Bayerwerk, Fed. Rep. of Germany

[21] Appl. No.: 849,649

[22] Filed: Apr. 9, 1986

[30] Foreign Application Priority Data

Apr. 26, 1985 [DE] Fed. Rep. of Germany ....... 3515092

[51] Int. Cl.$^4$ .............................................. C08L 75/00
[52] U.S. Cl. ................................... 525/124; 525/330.1
[58] Field of Search .................. 525/124, 329.7, 329.8, 525/330.1, 385; 528/75, 76, 297, 366

[56] References Cited

U.S. PATENT DOCUMENTS

| | | | |
|---|---|---|---|
| 3,002,959 | 10/1961 | Hicks | 260/88.1 |
| 3,116,270 | 12/1963 | Pennino | 260/86.1 |
| 3,375,227 | 3/1968 | Hicks | 260/47 |

FOREIGN PATENT DOCUMENTS

| | | |
|---|---|---|
| 590775 | 5/1960 | Belgium . |
| 1248660 | 5/1965 | Fed. Rep. of Germany . |
| 1248660 | 8/1967 | Fed. Rep. of Germany . |
| 3148022 | 6/1983 | Fed. Rep. of Germany . |
| 771569 | 4/1957 | United Kingdom . |
| 940766 | 11/1963 | United Kingdom . |
| 1002343 | 8/1965 | United Kingdom . |
| 1515868 | 6/1978 | United Kingdom . |

Primary Examiner—John C. Bleutge
Assistant Examiner—A. Carrillo
Attorney, Agent, or Firm—Gene Harsh; Joseph C. Gil; Thomas W. Roy

[57] ABSTRACT

The present invention is directed to a process for the preparation of polymers containing hydroxyl groups by reacting polymers based on acrylic acid and/or methacrylic acid and containing carboxyl groups with alkylene oxides in the presence of catalysts, characterized in that the catalysts used are (a) addition products containing two thioether groups of (i) mercaptoalkanols corresponding to the formula

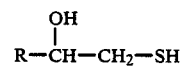

and (ii) doubly unsaturated terpene hydrocarbons and/or condensation products with a maximum molecular weight of 5000 obtained by the condensation of such addition products on their own or with other polyhydric alcohols having a molecular weight of 62 to about 200, and/or (b) relatively high molecular weight thioethers having a molecular weight of about 500 to 5000 obtainable by the condensation of thiodiglycols corresponding to the formula

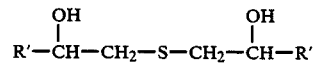

optionally in admixture with up to 50 hydroxyl equivalents percent, based on the total mixture, of other polyhydroxyl compounds having a molecular weight of 62 to about 200, in which formula, R and R' may be identical or different and denote hydrogen or a methyl group.

The present invention is further directed to the use of the hydroxyl containing alkoxylation products obtained by this process as reactants for organic polyisocyanates (optionally blocked with blocking agents for isocyanate groups) in the production of polyurethane plastics, in particular high quality polyurethane coatings.

14 Claims, No Drawings

PROCESS FOR THE PREPARATION OF POLYMERS CONTAINING HYDROXYL GROUPS AND THEIR USE FOR THE PRODUCTION OF POLYURETHANES

BACKGROUND OF THE INVENTION

1. Field of the Invention

The present invention relates to a new process for the preparation of polymers containing hydroxyl groups by the alkoxylation of copolymers of acrylic acid and/or methacrylic acid with other olefinic compounds using special sulphur-containing catalysts, and the use of these polymers as reaction partners for organic polyisocyanates in the production of polyurethane plastics, in particular lacquers and coatings.

2. Description of the Prior Art

Polymer resins containing hydroxyl groups based on olefinically unsaturated monomers and their use as binders for coating materials have been described in numerous publications (see e.g. DE-OS Nos. 2,460,329, 1,038,754, U.S. Pat. Nos. 3,002,959, 3,375,227, GB-PS No. 1,515,868).

These known polymer resins containing hydroxyl groups are generally prepared by the use of hydroxyalkyl esters of acrylic acid and/or methacrylic acid as comonomers. This method is complicated since these special comonomers containing hydroxyl groups must first be prepared by a costly preliminary process.

The present invention was directed to providing a new, simple process for the preparation of polymer resins containing hydroxyl groups which could be used in the same manner as the known hydroxyl-containing polymer resins of the current state of the art in combination with organic polyisocyanates for producing high quality polyurethane resins, in particular coatings.

This problem could be solved by the process according to the invention described below wherein polymer resins containing carboxyl groups are converted into the corresponding polymer resins containing hydroxyl groups by the alkoxylation reaction. The advantage of the process according to the invention compared with the state of the art is that preparation of the polymer resins does not require the use of hydroxyalkyl esters of acrylic or methacrylic acid previously prepared by an expensive procedure in a separate reaction step. Instead, the starting materials used according to the invention are copolymers of the above mentioned acids with other olefinically unsaturated monomers.

It has previously been known that compounds containing carboxyl groups could be converted into the corresponding compounds containing hydroxyalkyl groups in an aqueous or organic medium or solvent free with alkylene oxides such as ethylene oxide, propylene oxide or 1,2-butylene oxide in the presence of basic catalysts such as tertiary amines, tetraalkylammonium hydroxides, alkali metal or alkaline earth metal oxides or hydroxides, basic ion exchangers or simple thioethers such as thiodiglycol (see e.g. U.S. Pat. No. 3,116,270, BE-P No. 634,310, BE-P No. 590,775, GB-P Nos. 771,569, 940,766, 1,002,343, DE-OS No. 3,148,022 or DE-AS No. 1,248,660). However, the basic substances accelerate not only the reaction of carboxyl groups with epoxides, but also ester interchange and trans-esterification reactions as well as the addition the epoxides to hydroxyalkyl groups. This means that in the alkoxylation of polymers containing carboxyl groups, the reaction of substantial proportions of carboxyl groups requires the use of substantially more than the equivalent quantity of epoxide, that the end products have an undesirably high ether group content, and that linkages are formed between the polymer chains which may lead to undesirable increases in viscosity even to the extent of causing gelation. In addition, undesirable discolorations are liable to occur in the case of aminic catalysts. Although the use of simple thioethers such as thiodiglycol (DE-AS No. 1,248,600) as catalysts is effective for the alkoxylation of simple carboxylic acids such as formic acid, acetic acid, adipic acid or benzoic acid, to name but a few, such simple thioethers have not hitherto been recommended for the alkoxylation of copolymers containing carboxyl groups. The thioethers recommended as catalysts in DE-AS No. 1,248,660 would in any case be to a large extent unusable for this purpose since the thio compounds, which are in most cases malodorous, could not be removed from the end products such that they become unusable for the intended purpose (production of polyurethane lacquers).

The solution according to the invention to the discussed problem entails carrying out the alkoxylation of the polymers containing carboxyl groups in the presence of selected catalysts.

SUMMARY OF THE INVENTION

The present invention is directed to a process for the preparation of polymers containing hydroxyl groups by reacting polymers based on acrylic acid and/or methacrylic acid and containing carboxyl groups with alkylene oxides in the presence of catalysts, characterized in that the catalysts used are (a) addition products containing two thioether groups of (i) mercaptoalkanols corresponding to the formula

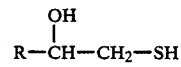

and (ii) doubly unsaturated terpene hydrocarbons and/or condensation products with a maximum molecular weight of 5000 obtained by the condensation of such addition products on their own or with other polyhydric alcohols having a molecular weight of 62 to about 200, and/or (b) relatively high molecular weight thioethers having a molecular weight of about 500 to 5000 obtainable by the condensation of thiodiglycols corresponding to the formula

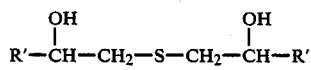

optionally in admixture with up to 50 hydroxyl equivalents percent, based on the mixture, of other polyhydroxyl compounds having a molecular weight of 62 to about 200, in which formula, R and R' may be identical or different and denote hydrogen or a methyl group.

The present invention is further directed to the use of the hydroxyl containing alkoxylation products obtained by this process as reactants for organic polyisocyanates (optionally blocked with blocking agents for isocyanate groups) in the production of polyurethane plastics, in particular high quality polyurethane coatings.

DETAILED DESCRIPTION OF THE INVENTION

The polymer resins to be used in the process according to the invention are copolymers of acrylic acid and/or methacrylic acid with other olefinically unsaturated compounds.

Examples of suitable comonomers include the alkyl esters of acrylic acid and/or methacrylic acid having 1 to 12, preferably 1 to 4 carbon atoms in the alkyl group, e.g. methyl-, ethyl-, n-propyl-, n-butyl-, or n-dodecyl-acrylate and/or methacrylate, acrylonitrile, methacrylonitrile and/or styrene. The addition of hydroxyalkyl esters of acrylic acid and/or methaacrylic acid is less preferred for the reasons given above. Particularly suitable starting materials for the process according to the invention are copolymers based on about 7 to 40% by weight of acrylic acid and/or methacrylic acid, 0 to about 88% by weight of styrene, acrylonitrile and/or methacrylonitrile, and about 5 to 80% by weight of acrylic acid and/or methacrylic acid alkyl esters of the type exemplified, the said percentages being based on the total monomer mixture used for the copolymers and adding up to 100. The preferred copolymers generally have an average molecular weight $M_{GPC}$ of about 1000 to 80,000, preferably about 1000 to 40,000: a molecular inhomogeneity U of from about 0.5 to 15, preferably about 0.5 to 10, and acid numbers of about 50 to 300, preferably about 80 to 200 mg KOH/g.

The preparation of such polymer resins ("polyacrylate resins") may be carried out by the usual methods of polymerization, preferably in solution.

Suitable solvents include aromatic solvents such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane and ethyl glycol ether; ketones such as acetone and methyl ethyl ketone; and halogen-containing solvents such as methylene chloride and trichloromonofluoroethane. If the apolar solvents exemplified above have insufficient solubilizing power, they are advantageously used in admixture with the polar solvents exemplified.

The polyacrylate resins may be prepared either continuously or batchwise. If the monomer mixture and the initiator are introduced uniformly and continuously into a polymerization reactor and at the same time the corresponding quantity of polymer is continuously discharged, a stationary state is established in the reactor after a relatively short starting period.

Stationary conditions prevail when the concentrations of the reactants do not change in the course of time. Under such conditions, chemically uniform copolymers can be obtained, but copolymers which are almost chemically uniform may also be prepared by running the reaction mixture at a constant rate into a stirrer vessel without discharging the polymer.

Suitable initiators for the preparation of the polyacrylate resins are those compounds which have a half life of radical decomposition of about 0.01 to 400 minutes at about 80° to 180° C. The copolymerization reaction generally takes place in the last mentioned temperature range, preferably at about 100° C. to 160° C. under a pressure of about $10^3$ to $2 \times 10^4$ mbar, the exact temperature depending on the nature of the initiator. The initiators are used in quantities of about 0.05 to 6% by weight, based on the total quantity of monomers. The monomers put into the process generally undergo reaction to an extent of at least about 98%.

Examples of suitable initiators include aliphatic azo compounds such as azoisobutyronitrile and peroxides such as dibenzoyl peroxide, tert.-butylperpivalate, tert.-butylper-2-ethylhexanoate, t-butylperoctoate, tert.-butylperbonzoate, tert.-butylhydroperoxide, di-tert.-butyl peroxide, cumene hydroperoxide and dicyclohexyl- and dibenzyl-peroxydicarbonate.

The usual regulators may be employed to regulate the molecular weight of the acrylate resin, e.g. n-dodecylmercaptan, diisopropylxanthogen disulphide, di(methylene trimethylolpropane)xanthogen disulphide and mercapto-ethanol. Mercaptoethanol is particularly preferred because of its hydroxyl group. The molecular weight regulaors are added in quantities of about 0.1 to 3% by weight, based on the monomer mixture.

The copolymer resins have the properties already mentioned above. The molecular weight nonuniformity U (inhomogeneity factor U) mentioned in this connection is defined by the equation:

$$U = (M_w/M_n) - 1$$

where $M_w$ is the weight average molecular weight and
$M_n$ is the numerical average molecular weight.

It is known in the art that products which have the same average molecular weight (numerical average $M_n$) but different molecular non-uniformities have different solution viscosities. The product with the greater nonuniformity always has a higher solution viscosity since high molecular weight constituents make a substantially greater contribution to the viscosity than an equal quantity of low molecular weight constituents. Moreover, a wide molecular weight distribution means that the number of reactive groups per molecule and hence the reactivities of the individual chains show wide differences.

Alkylene oxides suitable for the process according to the invention may be any organic compounds containing the structural unit

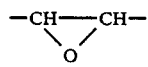

These include compounds corresponding to the formula

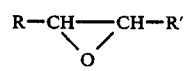

wherein R and R' are identical or different and represent hydrogen, alkyl groups with 1 to 16 carbon atoms which together with the two carbon atoms of the epoxide group may also form a cycloalkyl group with 5 to 12 carbon atoms, or aryl groups with 6 to 12 carbon atoms. The aforesaid groups may also contain hetero atoms or functional substituents, in particular hydroxyl substituents. Suitable examples include ethylene oxide, propylene oxide, 1,2-butylene oxide, 2,3-butylene oxide, styrene oxide, cyclohexene oxide, glycidyl alcohol and versatic acid glycidyl ester. Ethylene oxide, propylene oxide, glycidyl alcohol and mixtures of such alkylene oxides are preferred. Ethylene oxide and/or propylene oxide are particularly preferred.

The thioethers mentioned under (a) and (b) are used as catalysts for the alkoxylation reaction.

The compounds mentioned under (a) are products of addition containing two thioether groups and are obtained by the addition of mercapto alkanols corresponding to the above general formula to doubly unsaturated terpene hydrocarbons. They may also be condensation products with a maximum molecular weight of 5000 of such addition products on their own or with other polyhydric alcohols having a molecular weight of 62 to about 200. The said "other polyhydric alcohols" may be introduced into the condensation reaction in a quantity of up to about 50 hydroxyl equivalents, %, based on the reaction mixture to be used in the condensation reaction.

1-Mercapto-2-hydroxypropane and especially -mercapto-2-hydroxyethane (mercaptoethanol) are suitable mercapto alkanols. Examples of suitable doubly unsaturated terpene hydrocarbons include the naturally occurring derivatives of menthadienes, e.g. α-terpinene, γ-terpinene, terpinolene, α-phelladrene, β-phelladrene and particularly limonene. The doubly unsaturated terpene hydrocarbons exemplified above may be used both in the (+), in the (−) and in the racemate form. The natural racemates are preferably used. Dipentene, which is constitutionally similar to limonene and obtainable by the dimerization of isoprene may also be used according to the invention.

The products of addition are prepared by simply stirring the mercaptoalkanol together with the doubly unsaturated terpene hydrocarbon at room temperature, preferably with the introduction of air (catalysis by atmospheric oxygen), at least 2 mol of mercaptoalkanol being used per mol of the doubly unsaturated terpene hydrocarbon and any excess of mercaptoalkanol present above this molar ratio being distilled off under vacuum after the addition reaction.

The condensation products to be used as catalysts instead of such addition compounds or in admixture with them generally have a sulphur content in the form of thioether groups amounting to about 15 to 30% by weight and are prepared by condensation of the addition products on their own or with other polyhydric alcohols having a molecular weight of 62 to about 200. The condensation reaction is preferably carried out in the presence of catalysts such as the phosphoric acids mentioned in DE-AS No. 1,039,232, but most preferably in the presence of phosphorous acid. The condensation reaction is generally carried out at a temperature of about 120° to 200° C.

The optional polyhydric alcohols include alkanediols optionally containing thioether bridges or trihydric aliphatic alcohols within the above mentioned molecular weight range such as ethylene glycol, 1,2- and 1,3-dihydroxypropane, 1,2-, 2,3- or 1,4-dihydroxybutane, 1,6-hexanediol, glycerol, trimethylolpropane, bis-(2-hydroxyethyl)-thioether and/or bis-(2-hydroxypropyl)-thioether. The sulphur-free polyhydric alcohols are used, if at all, in a quantity of up to about 50 hydroxy equivalents %, based on the reaction mixture to be used in the condensation reaction. The sulphur-containing diols exemplified above may also be used in quantities amounting to more than about 50 hydroxy equivalents % for the preparation of the condensation products as long as the quantity conforms to the sulphur content mentioned above. The maximum molecular weight of the condensation products is about 5000. The molecular weight is fixed by suitable choice of the reaction time and is controlled by determining the quantity of water distilled off or the hydroxyl number of the reaction product.

The catalysts mentioned under (b) above for the process according to the invention are relatively high molecular weight thioethers having a molecular weight of about 500 to 5000 such as those obtained by the condensation of compounds corresponding to the formula

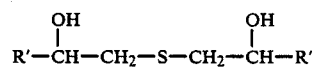

on their own or with other polyhydric alcohols having a molecular weight of about 62 to 200. The dihydroxy polyethers corresponding to the last mentioned general formula are those wherein R' represents hydrogen or a methyl group, i.e. 2,2'-dihydroxy-diethylthioether (thiodiglycol) or 2,2'-dihydroxy-di-n-propylthioether. Thiodiglycol is preferably used. The polyhydric alcohols are sulphur-free aliphatic, polyhydric alcohols of the kind previously exemplified under (a). Again, the polyhydric alcohols are used, if at all, in a quantity of up to about 50 hydroxy equivalents %, based on the reaction mixture to be used in the condensation reaction.

The condensation reaction for the preparation of catalyst (b) is carried out in a manner completely analogous to that indicated above for the preparation of the condensation products mentioned under (a). The condensation reaction is stopped when the condensation products have reached an average molecular weight of about 500 to 5000. The molecular weight is again controlled by determining the quantity of water distilled off or the hydroxyl number of the reaction mixture.

The catalysts mentioned under (a) and/or under (b) are used in a quantity of about 0.1 to 3% by weight, preferably about 0.3 to 1.5% by weight, based on the total reaction mixture used for carrying out the process according to the invention.

The process according to the invention is preferably carried out in the presence of a solvent or solvent mixture but may also be carried out solvent-free. Examples of suitable solvents include the polymers mentioned above in connection with the preparation of the polymers containing carboxyl groups. It is particularly preferred to use about 40 to 80% by weight solutions of the polymers. The alkoxylation reaction is generally carried out at a temperature of about 60° to 160° C., preferably about 100° to 140° C., optionally under pressure. The procedure is generally conducted by adding the alkylene oxide or alkylene oxide mixture continuously or intermittently over a period of about 0.2 to 10 hours, preferably about 1 to 5 hours, and within the above mentioned temperature range, to a solution, for example about a 40 to 80% by weight solution, of a polymer containing carboxyl groups after addition of the sulphur-containing catalyst. The reaction mixture is then left to react in the same temperature range for about 2 to 15 hours, preferably about 4 to 10 hours. Any small quantities of alkylene oxide still present are then removed by partial distillation or under reflux in a vacuum. The quantity of alkylene oxide during the reaction is chosen so that the equivalent ratio of alkylene oxide to carboxyl groups is about 0.5:1 to 1.5:1, preferably about 0.8:1 to 1.2:1.

When carrying out the process according to the invention, it is a goal to achieve selective esterification of the carboxyl groups with formation of hydroxyalkyl ester groups and at the same time to eliminate the formation of unwanted reaction products containing ether groups (due to alkoxylation of hydroxyl groups) and the possible formation of ester groups by an esterification reaction between hydroxyl and carboxyl groups present in the reaction mixture.

The process according to the invention enables the carboxyl groups to be converted almost selectively into hydroxyalkyl ester groups such that in the particularly preferred case of using alkylene oxides in equivalent quantities, based on the acid groups, reaction products with a high hydroxyl number and low acid numbers are obtained.

Due to their high hydroxyl group content and low carboxyl group content, the products of the process according to the invention are valuable reactants for organic polyisocyanates in the production of polyurethane plastics, in particular polyurethane lacquers. Since the molecular weights of the oligomeric and polymeric starting compounds are not significantly increased by the alkoxylation reaction according to the invention, the molecular weights of the end products according to the invention generally lie within the ranges mentioned above for the starting materials. The hydroxyl numbers of the products according to the invention are generally about 40 to 290, preferably about 70 to 190 (mg KOH/g of substance) and the acid numbers are about 1 to 25 (mg KOH/g of substance), but due to the modification according to the invention, the acid number generally amounts to less than half of the acid number of the corresponding starting material. When the alkoxylating agents are used in equivalent quantities, based on the carboxyl groups in the starting materials, as is particularly preferred according to the invention, the process according to the invention generally achieves a reduction in the acid number to less than about 10% of the starting value.

Suitable polyisocyanates for the use according to the invention include in particular the so-called lacquer polyisocyanates known in the art, the preparation of which has been described in U.S. Pat. Nos. 3,124,605, 3,358,010, 3,903,126, 3,903,127, 3,976,622, 3,645,979 or 3,919,218 or in GB-P Nos. 1,060,430, 1,234,972, 1,506,373 or 1,458,564.

These lacquer polyisocyanates are preferably polyisocyanates containing biuret groups, urethane groups or isocyanurate groups and are based on simple, commercial diisocyanates such as hexamethylene diisocyanate, 2,4- and/or 2,6-diisocyanatotoluene, 2,4'-and/or 4,4'-diisocyanato-dicyclohexylmethane or isophorone diisocyanate.

The polyisocyanates containing biuret groups may be obtained from the reaction of hexamethylene diisocyanate with water, amines or compounds which split off water. They are mixtures of tris-(isocyanatohexyl)biuret with its higher homologues. These biuret polyisocyanates are particularly preferred lacquer polyisocyanates.

The polyisocyanates containing urethane groups include reaction products of 2,4- and/or 2,6-diisocyanatotoluene or of isophorone diisocyanate with subequivalent quantities of polyhydric alcohols, in particular trimethylolpropane, optionally in admixture with propanediols or butanediols.

The lacquer polyisocyanates containing isocyanurate groups are preferably isocyanate group-containing trimers or mixed trimers of the simple diisocyanates exemplified above.

It is also possible in principle to use the isocyanate components in a blocked form with blocking agents for isocyanate groups, e.g. phenols, oximes such as cyclohexanoneoxime, ε-caprolactam, diethyl malonate or ethyl acetoacetate, so that thermally cross-linkable stoving lacquers result.

When the products according to the invention are used in accordance with the invention, in particular for the production of two-component polyurethane lacquers, the products obtained according to the invention and the lacquer polyisocyanates exemplified above are used in quantities corresponding to about 0.5 to 2, preferably about 0.7 to 1.3 optionally blocked isocyanate groups for each hydroxyl group of the products produced according to the invention.

When the products of the invention are used in accordance with the invention, other reactants for organic polyisocyanates known from the chemistry of polyurethane lacquers may also be used. Also, the compositions may also contain any of the known auxiliary agenss and additives used in polyurethane lacquers such as solvents, levelling agents, viscosity-controlling additives, matting agents, accelerators, pigments and fillers.

When the products of the process according to the invention are used according to the invention for the production of lacquer coatings, any methods of lacquer technology may be employed such as spraying, brush coating, dipping, pressure application or roller application. Substrates of any kind may be coated, e.g. metals, wood, brickwork, concrete, glass, ceramics, plastics, textiles or paper. Even when lacquer polyisocyanates containing free isocyanate groups are used, the two-component polyurethane lacquers ready for use are distinguished by their long pot life, rapid drying time, level flow and color fastness, and light-fastness and excellent mechanical properties of the coatings obtained from them. The ease with which they can be diluted should also be particularly mentioned, and this applies in particular to two-component polyurethane lacquers based on copolymers of acrylic and/or methacrylic acid which have been modified according to the invention and the lacquer polyisocyanates exemplified above containing aromatic hydrocarbons such as toluene or xylene.

When lacquer polyisocyanates with free isocyanate groups are used, the lacquer coatings are hardened at about 20° to 140° C., preferably about 20° to 60° C.: whereas, when blocked polyisocyanates are used the stoving lacquers obtained are hardened at about 120° to 180° C.

The Examples which follow serve to further illustrate the invention. All percentages are percentages by weight unless othewise stated.

EXAMPLES

The following catalysts according to the invention were used in the examples:

Catalyst I 780 g of 2-mercaptoethanol and 545 g of d,1-limonene were stirred at room temperature for 24 hours in a 2-liter round bottomed flask while air was introduced. Excess mercaptoethanol was then distilled off under vacuum. A diadduct of mercaptoethanol and limonene having the following analytical data was obtained:
OH number: 381
viscosity: 25° C./1300 mPas.

Catalyst II 29.3 parts by weight of 85% phosphorous acid were added to 5856 parts by weight of thiodiglycol. The reaction mixture was then heated to 180° C. with stirring while nitrogen was passed through. This reaction temperature was maintained until 765 ml of water had been split off. A water jet vacuum was then applied for 3 hours at 180° C. A reaction product having an OH number of 110 and an average molecular weight of about 1000 was obtained in a 91% yield.

Polymer resins A to D, the compositions and properties of which are summarized in the following Table, were used in the following examples. Preparation of the polymer resins from the starting materials shown in the Table was carried out according to the following general method of preparation:

About 90% of the given quantity of butyl acetate was introduced into a suitable reaction vessel, a stirrer vessel equipped with a gas inlet tube and reflux condenser, and heated to 120° C. The mixture of monomers and at the same time a solution of mercaptoethanol and t-butylperoctoate in the remaining quantity of butyl acetate were then gradually added with stirring at this temperature under an atmosphere of nitrogen over a period of 5 hours. Stirring was then continued for 3 hours under nitrogen at 120° C.

After cooling of the reaction mixture, a clear solution of the polymer in butyl acetate was obtained. This solution will subsequently be referred to as "polymer resin".

| Polymer resin | A Parts by weight | B Parts by weight | C Parts by weight | D Parts by weight |
|---|---|---|---|---|
| Styrene | 20.91 | 19.66 | 19.38 | 18.13 |
| Methyl methacrylate | 20.91 | 19.66 | 19.38 | 18.13 |
| Acrylic acid | 12.80 | 12.80 | 15.87 | 15.87 |
| 2-Ethyl-hexylacrylate | 2.88 | 2.88 | 2.87 | 2.87 |
| Mercapto ethanol | 0.50 | 3.00 | 0.50 | 3.00 |
| tert.-Butylperoctoate | 3.00 | 3.00 | 3.00 | 3.00 |
| Butyl acetate | 39.00 | 39.00 | 39.00 | 39.00 |
| Characteristic Values: | | | | |
| Solids content % | 60.5 | 59.8 | 60.0 | 59.6 |
| Viscosity (mPa/s 20° C.) | 102380 | 8682 | 342900 | 21360 |
| Density (g/ml) | 1.035 | 1.035 | 1.038 | 1.062 |
| Acid number | 100 | 100 | 118 | 122 |
| Color value (APHA, DIN 54 409) | 15 | 15 | 20 | 10 |
| OH number | 4 | 21 | 4 | 21 |

EXAMPLE 1

6000 g of polymer resin A and 65.7 g of catalyst I were introduced into a 10-liter flask over which nitrogen was passed. After vigorous rinsing with nitrogen, 504 g of ethylene oxide were added in the course of 3 hours at 110° to 120° C. and a nitrogen pressure of 1.5 bar. After reacting for 6 hours at 130° C., the 100 ppm of ethylene oxide still remaining in the product were removed by reflux boiling under vacuum (50° C., 60 mm Hg) A colorless polyacrylate containing hydroxyl groups and free from ethylene oxide and having the following properties was obtained:
Solids content % by weight: 65.0
$\eta_{25°\ C.}$ (mPas): 2214
Density (g/ml, 25° C.): 1.04
OH number (mg KOH/g): 94.6
Acid number (mg KOH/g): 5.2
Color value (APHA): 25

EXAMPLE 2

6000 g of polymer resin B and 33.4 g of catalyst I were reacted with 683 g of propylene oxide as in Example 1. The crude solution still contained about 500 ppm of propylene oxide, which were removed as in Example 1. A slightly yellowish colored polyacrylate having the following properties was obtained:
Solids content % by weight: 64.1
$\eta_{25°\ C.}$ (mPas): 575
Density (g/ml, 25° C.): 1.04
OH number(mg KOH/g): 106
Acid number (mg KOH/g) 6.0
Color value (APHA): 50

EXAMPLE 3

3000 g of polymer resin A (5.35 mol of carboxyl groups) and 15 g of catalyst I were heated together to 110° C. 396 g (5.35 mol) of glycidyl alcohol were added dropwise in the course of one hour. The acid number fell to 15.3 mg of KOH/g in the course of 10 hours at 110° C. 40 g (10% excess) of glycidyl alcohol were then added and the reaction mixture was stirred for a further 10 hours. The acid number was then 5.8 mg of KOH/g and the residual glycidyl alcohol content was 0.05%. The solids content was restored to its original value by dilution with 260 g of butyl acetate. A slightly yellowish, viscous solution having the following properties was obtained:
Solids content % by weight: 60.5
$\eta_{25°\ C.}$ (mPas): 20,000
OH number (mg KOH/g): 151
Acid number (mg KOH/g): 5.2
Color value (APHA): 60

EXAMPLE 4

6000 g of polymer resin B and 20 g of catalyst II were reacted with 526 g of ethylene oxide as in Example 1. The crude solution was free from ethylene oxide after the reaction and had the following properties:
Solids content (% by weight) 63.2
$\eta_{25°\ C.}$ (mPas) 508
Density (g/ml, 25° C.): 1.06
OH number (mg KOH/g): 104
Acid number (mg KOH/g) 4.9
Color value (APHA): 20

EXAMPLE 5

6000 g of polymer resin C and 67 g of catalyst I were reacted with 648 g of ethylene oxide as in Example 1. The crude solution was free from ethylene oxide after the reaction and had the following properties:
Solids content % by weight: 65.0
$\eta_{25°\ C.}$ (mPas) 508
Density (g/ml, 25° C.): 1.03
OH number (mg KOH/g): 116
Acid number (mg KOH/g): 4.5
Color value (APHA) 20

EXAMPLE 6

6000 g of polymer resin D and 35 g of catalyst I were reacted with 876 g of propylene oxide as in Example 1. After 10 hours' further reaction at 130° C., a slightly yellowish product still containing 0.3% of propylene oxide was obtained. The propylene oxide was removed by reflux boiling under vacuum and a product having the following properties was obtained:

Solids content % by weight 64.8
$\eta_{25°\,C.}$ (mPas):725
Density (g/ml, 25° C.): 1.04
OH number (mg KOH/g) 120
Acid number (mg KOH/g): 8.2
Color value (APHA) 40

EXAMPLE 7

6000 g of polymer resin D and 20 g of catalyst I were reacted with 689 g of ethylene oxide as in Example 1. The crude solution still contained 200 ppm of ethylene oxide, which was removed as in Example 1. A lightly colored polyacrylate having the following properties was obtained:

Solids content % by weight: 63.9
$\eta_{25°\,C.}$ (mPas) 635
Density (g/ml, 25° C.): 1.07
OH number (mg KOH/g): 122
Acid number (mg KOH/g) 0.6
Color value (APHA): 20

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polymer containing hydroxyl groups by reacting a copolymer containing carboxyl groups and prepared from
   (A) acrylic acid, methacrylic acid or mixtures of acrylic acid and methacrylic acid and
   (B) at least one other olefinically unsaturated compound with an alkylene oxide in the presence of a catalyst comprising a member selected from the group consisting of
   (a1) an addition product containing two thioether groups and prepared from (i) a mercaptoalkanol corresponding to the formula

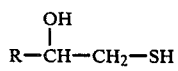

and (ii) a doubly unsaturated terpene hydrocarbon,
   (a2) a condensation product with a maximum molecular weight of about 5,000 obtained by the self condensation of an addition product containing two thioether groups and prepared from (i) a mercaptoalkanol corresponding to the formula

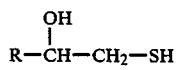

and (ii) a doubly unsaturated terpene hydrocarbon,
   (a3) a condensation product with a maximum molecular weight of about 5000 obtained by the condensation of an addition product containing two thioether groups and prepared from (i) a percaptoalkanol corresponding to the formula

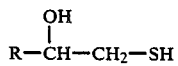

and (ii) a doubly unsaturated terpene hydrocarbon with a positive amount of up to about 50 hydroxyl equivalent %, based on the total number of hydroxyl groups in the condensation reaction mixture, of at least one polyhydric alcohol having a molecular weight of 62 to about 200,
   (b1) a relatively high molecular weight thioether having a molecular weight of about 500 to 5000 obtained by the condensation of a thiodiglycol corresponding to the formula

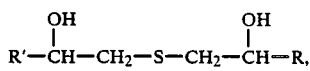

(b2) a relatively high molecular weight thioether having a molecular weight of about 500 to 5000 obtained by the condensation of a thiodiglyol corresponding to the formula

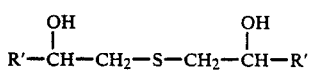

in admixture with a positive amount of up to about 50 hydroxy equivalent %, based on the total number of hydroxyl groups in the condensation reaction mixture, of at least one polyhydric alcohol having a molecular weight of 62 to about 200 and
   (c) mixtures of any of the above compounds (a1), (a2), (a3), (b1), and (b2),
   wherein
   R and R', which may be identical or different, represent hydrogen or a methyl group.

2. The process of claim 1 wherein said copolymer containing carboxyl groups is a copolymer of
   (1) about 7 to 40% by weight of acrylic acid, methacrylic acid or mixtures of acrylic acid and methacrylic acid,
   (2) 0 to about 88% by weight of a compound selected from the group consisting of styrene, acrylonitrile, and mixtures thereof and
   (3) about 5 to 80 % by weight of a member selected from the group consisting of an acrylic acid alkyl ester having 1 to 12 carbon atoms in the alkyl group, a methylacrylic acid alkyl ester having 1 to 12 carbons atoms in the alkyl group and mixtures thereof, the above mentioned percentages being based on the total quantity of the copolymer and adding up in each case to 100, said copolymer having an average molecular weight of about 1000 to 80,000 and a molecular inhomogeneity U of about 0.5 to 15.0.

3. The process of claim 1 which comprises conducting the alkoxylation reaction at a temperature of about 60° to 160° C.

4. The process of claim 2 which comprises conducting the alkoxylation reaction at a temperature of about 60° to 160° C.

5. The process of claim 1 wherein said alkylene oxide comprises a member selected from the group consisting of ethylene oxide, propylene oxide, glycidyl alcohol and mixtures thereof.

6. The process of claim 2 wherein said alkylene oxide comprises a member selected from the group consisting of ethylene oxide, propylene oxide, glycidyl alcohol and mixtures thereof.

7. The process of claim 3 wherein said alkylene oxide comprises a member selected from the group consisting of ethylene oxide, propylene oxide, glycidyl alcohol and mixtures thereof.

8. The process of claim 4 wherein said alkylene oxide comprises a member selected from the group consisting of ethylene oxide, propylene oxide, glycidyl alcohol and mixtures thereof.

9. The process of claim 1 wherein said alkylene oxide is used in a quantity corresponding to an equivalent rario of alkylene oxide to carboxyl groups of about 0.5:1 to 1.5:1.

10. The process of claim 2 wherein said alkylene oxide is used in a quantity corresponding to an equivalent ratio of alkylene oxide to carboxyl groups of about 0.5:1 to 1.5:1.

11. The process of claim 3 wherein said alkylene oxide is used in a quantity corresponding to an equivalent ratio of alkylene oxide to carboxyl groups of about 0.5:1 to 1.5:1.

12. The process of claim 5 wherein said alkylene oxide is used in a quantity corresponding to an equivalent ratio of alkylene oxide to carboxyl groups of about 0.5 1 to 1.5:1.

13. A process for the production of a polyurethane which comprises
   (a) preparing a polymer containing hydroxyl groups in accordance with claim 1 and
   (b) reacting said polymer containing hydroxyl groups with an organic polyisocyanate.

14. The process of claim 13 wherein said organic polyisocyanate is blocked with a blocking agent for isocyanate groups.

* * * * *